A. DECKER.
Bee Hive.
No. 4,129.
Patented July 30, 1845.
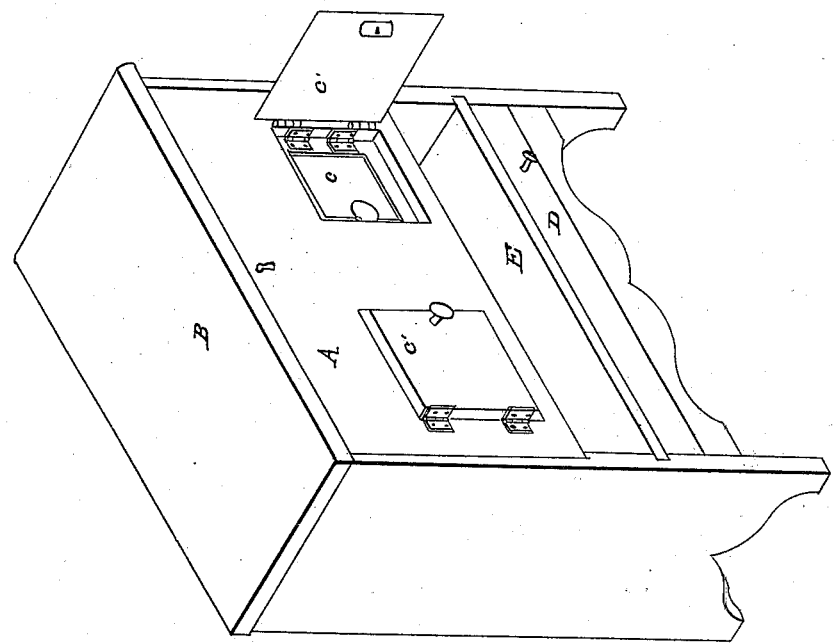
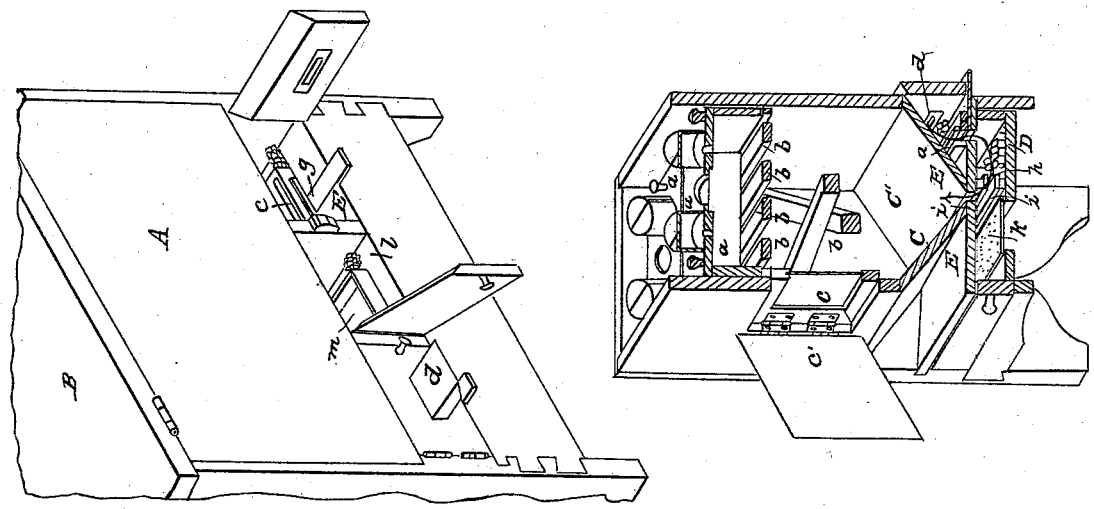

UNITED STATES PATENT OFFICE.

ABRAHAM DECKER, OF WALNUT TOWNSHIP, FAIRFIELD COUNTY, OHIO.

BEEHIVE.

Specification of Letters Patent No. 4,129, dated July 30, 1845.

*To all whom it may concern:*

Be it known that I, ABRAHAM DECKER, of Walnut township, in the county of Fairfield and State of Ohio have invented new and useful Improvements in beehives, and that the following is a full, clear, and exact description of the principle or character of my improvement and of the manner of constructing and using the same, reference being had to the accompanying drawings, which make part of this specification, in which—

Figure 1 is a perspective view of the bee palace, Fig. 2 a perspective view of the front thereof and Fig. 3 a transverse section in perspective to represent the inside of the hive.

The same letters indicate corresponding parts in all the views in which they appear.

The nature of my invention and that which distinguishes it from all other hives before known, consists in the arrangement of the passages through which the bees have to pass to enter the hive with the view to prevent the entrance of the miller, moth, worm and other insects into the hive and in providing in combination with this arrangement of the passages, compartments containing honey comb to detain the miller, moth on their way to the hive should they succeed in entering some of the passages.

The bee palace which I use is a quadrangular box A with the top B hinged to give access to the upper compartments $a$ $a$, of the hive which rest on slots $b$, $b$, $b$, with sufficient space between them for the free working of the bees. Other slots $b'$, $b'$ are placed across diagonally and some distance below. Windows $c$ $c$ are placed at the back of the palace, through which the inside can be observed and these are provided with hinged shutters $c'$ $c'$ to shut out the light when necessary. The bottom of the hive is formed of two inclined planes C C' inclined in opposite directions and downward from the front and back nearly to the middle and there leaving sufficient space between them for the entrance of the bees.

Thus far I have only described what is old and make no claim to the parts or combination of parts constituting the hive; but my invention consists as stated above, in arranging the comparts and passages for the admission of bees until they reach the aperture between the two inclined planes C C' whereby I am enabled to exclude the miller, moth, &c., from the hive. Just below these two planes and governing the aperture between them, there is a drawer D which when in place is covered by two boards E, E' on the same plane and extending back and forth from the bottom of the inclined planes C C' so as to leave the same space between their inner edges as between the inclined planes. The V-formed space between the plane C' and the horizontal board E' forms the first compartment through which the bees pass after entering the first passage, which is a horizontal flat tube $d$ projecting out some distance from the front of the palace, the outer end being an inverted inclined plane—the tube being attached to a shutter hinged to the palace, to give access to this compartment. A long and narrow aperture $e$ is made in the bottom of this compartment which constitutes the second passage and is surrounded by ledges; and between the first and second passages honey comb is to be put for the purpose of detaining the moth, miller and other insects, which may enter the first compartment. This second passage is vertical and leads to the second compartment $f$ formed in the back part of the drawer (the drawer being introduced from the back part of the palace) and may be closed when desired by a sliding valve $g$. The drawer is divided into two compartments, one front and the other back by a partition $h$, just forward of the aperture in the bottom of the hive, and in this partition is formed the third passage $i$, which is horizontal and made in other respects similar to the second passage, the second compartment leading thereto being provided in like manner and purpose as the first with honey combs. The other or front part of the drawer has a large hole in the bottom covered with a metal plate $k$ pierced with numerous small holes to ventilate the hive.

The palace may be divided into several hives by vertical and transverse partitions, the same division being made in the drawer. The palace represented in the accompanying drawings is divided into two hives.

Between the two entrance passages $d$ $d$ there is an additional trap for moths, millers and other insects, which is represented at $l$ and consists of a small tin box $m$, the edges of which are surrounded with honey comb placed in the compartment $l$ that corresponds with the first compartment leading to the hives and is provided with a shutter similar to the one which carries the flat tube or first passage and which not being provided with the long flat tube affords an easier entrance for these insects.

Having thus pointed out the characteristics or principle of my invention and the manner of making and using the same, what I claim as my invention and desire to secure by Letters Patent is—

1. The arrangement of the various passages leading to the hive and in combination therewith the chambers with honey-combs surrounding the passages, for the purpose as fully expressed above of preventing the entrance and detaining the miller, moth worm and other insects as herein fully described.

2. And I also claim in combination with the passages and the chamber the additional moth or insect trap situated relatively to the entrance passages as herein described.

ABRAHAM DECKER.

Witnesses:
H. C. WHITMAN,
HENRY MIERS.